(12) United States Patent
Nakamura

(10) Patent No.: US 8,404,966 B2
(45) Date of Patent: Mar. 26, 2013

(54) SOLAR CELL MODULE

(75) Inventor: Moritaka Nakamura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 611 days.

(21) Appl. No.: 12/674,717

(22) PCT Filed: Aug. 27, 2008

(86) PCT No.: PCT/JP2008/065296
§ 371 (c)(1),
(2), (4) Date: Feb. 23, 2010

(87) PCT Pub. No.: WO2009/028550
PCT Pub. Date: Mar. 5, 2009

(65) Prior Publication Data
US 2011/0120529 A1    May 26, 2011

(30) Foreign Application Priority Data

Aug. 31, 2007 (JP) ................. 2007-226606

(51) Int. Cl.
*H02N 6/00* (2006.01)
*H01L 31/042* (2006.01)
*E04D 13/18* (2006.01)
*E04H 14/00* (2006.01)

(52) U.S. Cl. ..................... 136/251; 52/173.3

(58) Field of Classification Search ............... 136/243, 136/244, 251; 52/173.3
See application file for complete search history.

(56) References Cited

FOREIGN PATENT DOCUMENTS

| JP | 59-138251 | 9/1984 |
| JP | 59-138251 U | 9/1984 |
| JP | 09-096071 | 4/1997 |
| JP | 2001-230440 | 8/2001 |
| JP | 2001-230440 A | 8/2001 |

OTHER PUBLICATIONS

International Search Report for PCT/JP2008/065296, mailed Oct. 7, 2008.
Microfilm of the specification and drawings annexed to the request of Japanese Utility Model Application No. 032638/1983.

*Primary Examiner* — Jeffrey T Barton
*Assistant Examiner* — Chuljoong Oh
(74) *Attorney, Agent, or Firm* — Nixon & Vanderhye, P.C.

(57) ABSTRACT

A solar cell module (1a) is constituted such that a solar cell panel (9) is held using a main frame member (10) that holds one side of the solar cell panel (9) and a sub-frame member (20) that holds an adjoining side that adjoins this one side, the main frame member (10) is constituted from a solar cell panel main holding portion (11), a main wall portion (12), and a main bottom piece (16), the sub-frame member (20) is constituted from a solar cell panel sub-holding portion (21), a sub-wall portion (22), and a sub-bottom piece (26), the sub-bottom piece (26) of the sub-frame member (20) is positioned above the main bottom piece (16) of the main frame member (10), the lower surface near the side end of this sub-bottom piece (26) abuts against the upper surface near the side end of the main bottom piece (16), and a water barrier piece (28) bent upward is formed at the inner side edge of this sub-bottom piece (26).

1 Claim, 18 Drawing Sheets

SOLAR CELL MODULE

This application is the U.S. national phase of International Application No. PCT/JP2008/065296, filed 27 Aug. 2008, which designated the U.S. and claims priority to Japanese Application No. 2007-226606, filed 31 Aug. 2007, the entire contents of each of which are hereby incorporated by reference.

TECHNICAL FIELD

The present invention relates to a solar cell module that holds a solar cell panel so as to surround that solar cell panel using a frame member, and that is installed in an inclined manner on an inclined place such as a roof.

BACKGROUND ART

Generally, solar cell modules are constituted from a solar cell panel and a frame member that holds this solar cell panel. As frame members used for such a solar cell module, members with various structures are known.

As the structure of the frame member, a frame member is known that has a structure provided with an outer wall perpendicularly formed along one side of the solar cell panel, and a solar cell panel holding unit that is horizontally formed at the upper part of this outer wall, and that has a U-shaped cross section.

By inserting a side of the solar cell panel into the inside of the U shape of the solar cell panel holding unit whose cross section is U-shaped, the frame member sandwiches the solar cell panel from above and below, forming a solar cell module.

Further, in order to fix a solar cell module in an installation place, the frame member is provided with a bottom piece that horizontally projects at the lower edge of the outer wall of this frame member. As a solar cell module using such a frame member, various modules have been conventionally known (see FIGS. 1 to 3 of Patent Document 1, for example).

With the solar cell module described in Patent Document 1, a bottom piece provided at the lower edge of a frame member used for this solar cell module projects from the lower edge of the frame member toward the outer side, which is opposite the solar cell panel side (inner side).

Note that in this specification, for solar cell modules that hold the periphery of a solar cell panel using a frame member, it is assumed that the "inner side" means the "side in the direction where the solar cell panel is located", and the "outer side" means the side opposite this "inner side", that is, the "side in the direction opposite the direction where the solar cell panel is located".
Patent document 1: JP H9-96071A

DISCLOSURE OF INVENTION

Problems to be Solved by the Invention

As described above, with the solar cell module described in Patent Document 1, the bottom piece provided at the lower edge of the frame member used for this solar cell module projects from the lower edge of the frame member toward the outer side, which is opposite the solar cell panel side (inner side).

Then, to arrange and install such solar cell modules, because of the bottom piece that projects from the lower edge of the frame member toward the outer side, space for disposing this bottom piece is necessary between the solar cell module and the solar cell module installed adjacently to it. Consequently, this wastes installation space.

In view of the above, in order to solve this, a frame member has been considered where a bottom piece of the frame member used for fixing a solar cell module projects from the lower edge of the frame member toward the inner side, that is, the solar cell panel side.

FIG. 24 is a partial exploded perspective view showing the structure of a solar cell module 3b according to a conventional example using such a frame member. This solar cell module 3b according to the conventional example has the following structure. That is, in FIG. 24, a solar cell panel 9 has a rectangular shape, and using two pairs of members, each pair constituted from a main frame member 50 that holds one side of this solar cell panel 9 and a sub-frame member 70 that holds an adjoining side that adjoins this one side, the solar cell panel 9 is held.

The above-mentioned main frame member 50 is constituted from a solar cell panel main holding portion 51, a main wall portion 52, and a main bottom piece 56. Among these, the solar cell panel main holding portion 51 has a U-shaped cross section, and inside the U shape, sandwiches one side of the solar cell panel 9 from above and below so as to hold the solar cell panel 9. The main wall portion 52 is connected to the bottom of the solar cell panel main holding portion 51 and extends downward therefrom. The main bottom piece 56 is provided to the inner side of the lower edge of the main wall portion 52, extending inward.

The sub-frame member 70 is constituted from a solar cell panel sub-holding portion 71, a sub-wall portion 72, and a sub-bottom piece 76. Among these, the solar cell panel sub-holding portion 71 has a U-shaped cross section, and inside the U shape, sandwiches an adjoining side of the solar cell panel 9 from above and below so as to hold the solar cell panel 9. The sub-wall portion 72 is provided with a sub-outer wall 73 and a sub-inner wall 74 that extend downward with an internal space 77 sandwiched therebetween, and a sub-base piece 75 that closes the internal space 77 at the lower edges of the sub-outer wall 73 and the sub-inner wall 74, provided under this solar cell panel sub-holding portion 71, the sub-wall portion 72 being constituted with a side end opening of the internal space 77 closed by abutting against with the main wall portion 52 of the main frame member 50. The sub-bottom piece 76 is provided to the inner side of the lower edge of the sub-inner wall 74 of the sub-wall portion 72, extending inward.

With the solar cell module 3b according to the above-mentioned conventional example, since the solar cell panel 9 is held using the main frame member 50 and the sub-frame member 70, when attempting to connect the corners of the main frame member 50 and the sub-frame member 70, as shown in FIG. 24, the main bottom piece 56 of the main frame member 50 and the sub-bottom piece 76 of the sub-frame member 70 collide with each other, the main frame member 50 and the sub-frame member 70 cannot be connected as they are.

In order to connect the main frame member 50 and the sub-frame member 70, it is necessary to remove a part of the sub-bottom piece 76 of the sub-frame member 70 (removal necessary portion 78) as shown in FIG. 24, and, therefore additional man-hours and costs for this task have been necessary.

In view of this, as a solar cell module that does not require the above-mentioned removal work, a new solar cell module 3a has been proposed. FIG. 20 is a partial perspective view showing such a solar cell module 3a, FIG. 21 is a partial exploded perspective view showing the structure of this solar cell module 3a, FIG. 22 is a partial plan view thereof, and FIG. 23 is a cross-sectional view taken along E-E in FIG. 22. Note that in FIGS. 20, 22, and 23, a solar cell panel 9 is omitted.

The new solar cell module 3a according to this conventional example is a module using a sub-frame member 60, instead of the sub-frame member 70 of the solar cell module 3b according to the above-described conventional example. The sub-frame member 60 has the almost same structure as the above-mentioned sub-frame member 70.

That is, in FIGS. 20 to 23, similar to the sub-frame member 70, this sub-frame member 60 is constituted from a solar cell panel sub-holding portion 61, a sub-wall portion 62, and a sub-bottom piece 66. Among these, the solar cell panel sub-holding portion 61 has a U-shaped cross section, and inside the U shape, sandwiches an adjoining side of the solar cell panel 9 from above and below, holding the solar cell panel 9. The sub-wall portion 62 is provided with a sub-outer wall 63 and a sub-inner wall 64 that extend downward with an internal space 67 sandwiched therebetween, and a sub-base piece 65 that closes the internal space 67 at the lower edges of the sub-outer wall 63 and the sub-inner wall 64, provided under the solar cell panel sub-holding portion 61, the sub-wall portion 62 being constituted with a side end opening of the internal space 67 closed by abutting against with the main wall portion 52 of the main frame member 50. The sub-bottom piece 66 is provided to the inner side of the lower part of the sub-inner wall 64 of the sub-wall portion 62, extending inward.

As shown in FIGS. 20 to 23, the sub-frame member 60 used for the new solar cell module 3a according to this conventional example differs from the above-mentioned sub-frame member 70 in that the sub-bottom piece 66 of this sub-frame member 60 is provided extending such that the sub-bottom piece 66 is positioned not at the lower edge of the sub-inner wall 64 of the sub-wall portion 62, but at the lower part of the sub-inner wall 64 of the sub-wall portion 62, and furthermore above the main bottom piece 56 of the main frame member 50, and the lower surface near the side end of the sub-bottom piece 66 abuts against the upper surface near the side end of the main bottom piece 56 of the main frame member 50.

Therefore, with the solar cell module 3a, it is possible to connect the corners of the main frame member 50 and the sub-frame member 60 such that the sub-bottom piece 66 of the sub-frame member 60 does not collide with the main bottom piece 56 of the main frame member 50.

Incidentally, there are many cases in which the solar cell module 3a according to the conventional example constituted as described above is installed in an inclined manner on an installation place such as an inclined roof, in order to be able to use sunlight efficiently, when used for a residence, for instance.

In this case, as shown in FIG. 20, generally, the solar cell module 3a is installed in an inclined manner such that one of the sub-frame members 60 is in the lowest position. Note that FIGS. 20 and 21 show that the solar cell module 3a is inclined relative to a horizontal surface 6 with an inclination angle 7. In this way, if the solar cell module 3a is installed in an inclined manner, when it is raining or the like, rainwater flows on the main bottom piece 56 of the inclined main frame member 50 from a higher position to a lower position.

The above-described solar cell module 3a has a structure in which the sub-bottom piece 66 of the sub-frame member 60 is provided extending such that the sub-bottom piece 66 is positioned above the main bottom piece 56 of the main frame member 50, and the lower surface near the side end of the sub-bottom piece 66 abuts against the upper surface near the side end of the main bottom piece 56 of the main frame member 50. Accordingly, along the stream direction indicated by an arrow 8 as shown in FIG. 20, rainwater flows from a higher position to a lower position, climbs over the level difference between the main bottom piece 56 and the sub-bottom piece 66, and flows onto the upper surface of the sub-bottom piece 66, from the main bottom piece 56.

The rainwater that has flowed onto this sub-bottom piece 66 flows into the internal space 67 of the sub-wall portion 62 through a gap between the sub-inner wall 64 of the sub-wall portion 62 and the main wall portion 52, for instance. As described above, this internal space 67 is closed with the side end opening of the internal space 67 abutting against the main wall portion 52 of the main frame member 50.

Then, the rainwater that has flowed into the internal space 67 of this sub-wall portion 62 may freeze during periods of extreme cold in cold locations, for instance. As described above, since the internal space 67 of the sub-wall portion 62 is closed, if rainwater and the like flow into this internal space 67 and freeze therein, a gap and the like around the internal space 67 will freeze due to this rainwater and the like. Accordingly, this internal space 67 becomes a closed space, and during periods of extreme cold in cold locations, for instance, rainwater may freeze and expand in volume, which may damage the sub-wall portion 62 of the sub-frame member 60. Thus, this has been one of the causes of damage to the solar cell module 3a.

In view of the above, the present invention has been conceived in order to improve such circumstances, and is aimed at providing a solar cell module that can be prevented from being damaged due to the freezing of rainwater and the like that have flowed in, if the solar cell module is installed in an inclined manner on an inclined place such as a roof.

Means for Solving the Problems

As a solar cell module of the present invention, it is possible to constitute two types of solar cell modules, namely a first solar cell module and a second solar cell module. First, the first solar cell module is described.

The first solar cell module of the present invention holds a solar cell panel so as to surround the solar cell panel on its inner side using a plurality of pairs of members, each pair constituted from a main frame member that holds one side of the solar cell panel and a sub-frame member that holds an adjoining side that adjoins this one side. Further, this first solar cell module is installed in an inclined manner on an inclined place such as a roof, such that one of the sub-frame members is in the lowest position.

The main frame member of the above-mentioned first solar cell module is provided with a solar cell panel main holding portion, a main wall portion, and a main bottom piece. Among these, the solar cell panel main holding portion has a U-shaped cross section, and sandwiches the one side of the solar cell panel from above and below inside the U shape, holding the solar cell panel. The main wall portion is connected to the bottom of the solar cell panel main holding portion, extending downward therefrom. The main bottom piece is provided to the inner side of the lower edge of the main wall portion, extending inward.

The sub-frame member of the above-mentioned first solar cell module is provided with a solar cell panel sub-holding portion, a sub-wall portion, and a sub-bottom piece. Among these, the solar cell panel sub-holding portion has a U-shaped cross section, and sandwiches the adjoining side of the solar cell panel from above and below inside the U shape, holding the solar cell panel.

The sub-wall portion is provided with a sub-outer wall and a sub-inner wall that extend downward with an internal space sandwiched therebetween, and a sub-base piece that closes the internal space at the lower edges of the sub-outer wall and the sub-inner wall, provided under the solar cell panel sub-holding portion, the sub-wall portion being constituted with a side end opening of the internal space closed by abutting against the main wall portion of the main frame member. The sub-bottom piece is provided to the inner side of the lower part of the sub-inner wall of the sub-wall portion, extending inward.

A feature of the above-mentioned first solar cell module is that the sub-bottom piece is positioned above the main bottom piece of the main frame member, and the lower surface near the side end of the sub-bottom piece abuts against the upper surface near the side end of the main bottom piece of the main frame member, and a water barrier piece bent upward is formed at the inner side edge of the sub-bottom piece.

Accordingly, if the above-mentioned first solar cell module is installed in an inclined manner, when it is raining, even though rainwater and the like flow on the main bottom piece of the inclined main frame member from a higher position to a lower position, due to the water barrier piece that is bent upward and formed at the inner side edge of the sub-bottom piece of the sub-frame member, rainwater and the like are dammed up and discharged downward from the inner side edge of the main bottom piece of the main frame member. Therefore, rainwater and the like are prevented from flowing onto the sub-bottom piece.

Consequently, with the above-mentioned first solar cell module, as described above, the side end opening of the internal space of the sub-frame member is closed by abutting against the main wall portion of the main frame member and, further, the flow of rainwater and the like onto the sub-bottom piece is prevented. Therefore, rainwater and the like do not flow into the internal space of the sub-wall portion. Accordingly, it is possible to avoid the sub-wall portion of the sub-frame member being damaged due to rainwater that has flowed into the internal space of the sub-wall portion freezing and expanding in volume. Therefore, if the above-mentioned first solar cell module is installed in an inclined manner on an inclined place such as a roof, it is possible to prevent the module being damaged due to the freezing of rainwater and the like that have flowed into it.

With the above-mentioned first solar cell module, it is preferable that the water barrier piece is formed such that the angle formed by the water barrier piece and the sub-bottom piece is between 90 degrees and 120 degrees. Further, in this case, it is preferable that the water barrier piece is formed such that the edge surface of this water barrier piece is substantially parallel to the sub-bottom piece. Further, it is preferable that the water barrier piece is formed such that the height to the edge surface of the water barrier piece from the upper surface of the sub-bottom piece is 2 mm or more.

Next, the second solar cell module of the present invention is descried. Similar to the first solar cell module of the present invention, the second solar cell module of the present invention holds a solar cell panel so as to surround the solar cell panel on its inner side using a plurality of pairs of members, each pair constituted from a main frame member that holds one side of the solar cell panel and a sub-frame member that holds an adjoining side that adjoins the one side. Similar to the first solar cell module, this second solar cell module is installed in an inclined manner on an inclined place such as a roof, such that one of the sub-frame members is in the lowest position.

The main frame member of the above-mentioned second solar cell module is provided with a solar cell panel main holding portion, a main wall portion, and a main bottom piece. Among these, the solar cell panel main holding portion has a U-shaped cross section, and sandwiches the one side of the solar cell panel from above and below inside the U shape, holding the solar cell panel. The main wall portion is connected to the bottom of the solar cell panel main holding portion, extending downward therefrom. The main bottom piece is provided to the inner side of the lower edge of the main wall portion, extending inward.

The sub-frame member of the above-mentioned second solar cell module is provided with a solar cell panel sub-holding portion, a sub-wall portion, and a sub-bottom piece. Among these, the solar cell panel sub-holding portion has a U-shaped cross section, and sandwiches the adjoining side of the solar cell panel from above and below inside the U shape, holding the solar cell panel.

The sub-wall portion is provided with a sub-outer wall and a sub-inner wall that extend downward with an internal space sandwiched therebetween, and a sub-base piece that closes the internal space at the lower edges of the sub-outer wall and the sub-inner wall, provided under the solar cell panel sub-holding portion, the sub-wall portion being constituted with a side end opening of the internal space closed by abutting against the main wall portion of the main frame member. The sub-bottom piece is provided to the inner side of the lower part of the sub-inner wall of the sub-wall portion, extending inward.

A feature of the above-mentioned second solar cell module is that the sub-bottom piece is positioned above the main bottom piece of the main frame member, and is formed such that there is a gap into which water can flow between the sub-bottom piece and the main bottom piece.

Accordingly, if the above-mentioned second solar cell module is installed in an inclined manner, when it is raining, even though rainwater and the like flow on the main bottom piece of the inclined main frame member from a higher position to a lower position, since there is a gap into which water can flow between the sub-bottom piece of the sub-frame member and the main bottom piece of the main frame member, rainwater and the like flow into the gap into which this water can flow, and are discharged downward. Therefore, rainwater and the like are prevented from flowing onto the sub-bottom piece.

Consequently, with the above-mentioned second solar cell module, as described above, the side end opening of the internal space of the sub-frame member is closed by abutting against the main wall portion of the main frame member and, further, the flow of rainwater and the like onto the sub-bottom piece is prevented. Therefore, rainwater and the like do not flow into the internal space of the sub-wall portion. Accordingly, it is possible to avoid the sub-wall portion of the sub-frame member being damaged due to rainwater that has flowed into the internal space of the sub-wall portion freezing and expanding in volume. Therefore, if the above-mentioned second solar cell module is installed in an inclined manner on an inclined place such as a roof, it is possible to prevent the module being damaged due to the freezing of rainwater and the like that have flowed into it.

Effects of the Invention

According to the present invention, with a solar cell module, the lower surface near the side end of a sub-bottom piece of a sub-frame member abuts against the upper surface near the side end of a main bottom piece of a main frame member, and a water barrier piece bent upward is formed at the inner side edge of the sub-bottom piece. Alternatively, the sub-bottom piece of the sub-frame member is positioned above the main bottom piece of the main frame member, and a gap into which water can flow is formed between the sub-bottom piece and the main bottom piece.

Accordingly, if the solar cell module is installed in an inclined manner, when it is raining, even though rainwater and the like flow on the main bottom piece of the inclined main frame member from a higher position to a lower position, due to the water barrier piece that is bent upward and formed at the inner side edge of the sub-bottom piece of the sub-frame member, rainwater and the like are dammed up and discharged downward from the inner side edge of the main bottom piece of the main frame member. Therefore, rainwater and the like are prevented from flowing onto the sub-bottom piece. Alternatively, since there is a gap into which water can flow between the sub-bottom piece of the sub-frame member and the main bottom piece of the main frame member, rainwater and the like flow into the gap into which this water can flow, and are discharged downward. Therefore, rainwater and the like are prevented from flowing onto the sub-bottom piece.

Therefore, since the flow of rainwater and the like onto this sub-bottom piece is prevented, rainwater and the like do not flow into the internal space of the sub-wall portion. Accordingly, it is possible to avoid the sub-wall portion of the sub-frame member being damaged due to rainwater that has flowed into the internal space of the sub-wall portion freezing and expanding in volume. For that reason, if the solar cell module is installed in an inclined manner on an inclined place such as a roof, it is possible to prevent the module being damaged due to the freezing of rainwater and the like that have flowed into it.

DESCRIPTION OF REFERENCE NUMERALS

Figure 1:
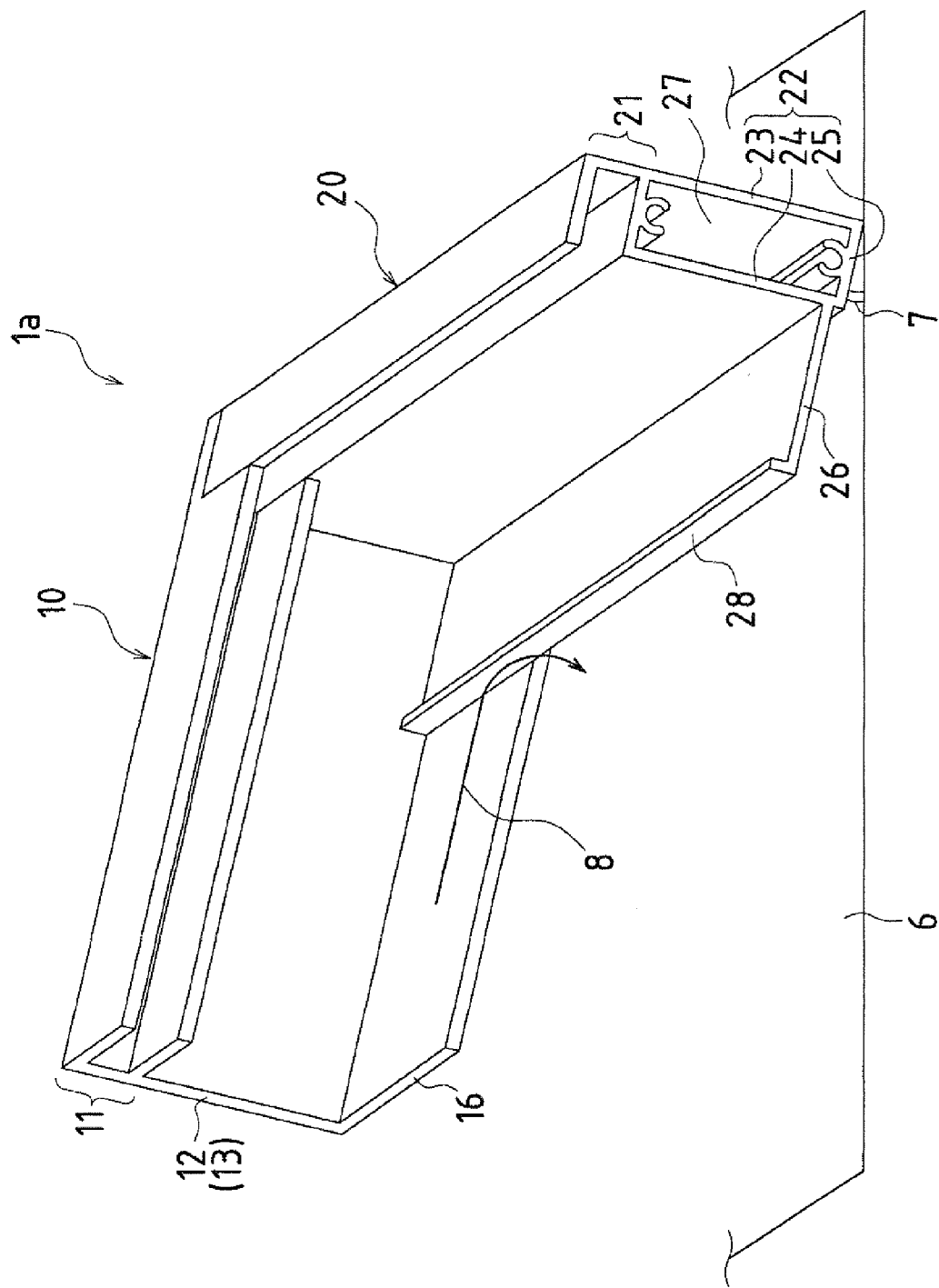
FIG. 1 is a partial perspective view of a solar cell module according to Embodiment 1 of the present invention.

1a solar cell module
1b solar cell module
2a solar cell module
2b solar cell module
3a solar cell module
3b solar cell module
6 horizontal surface
7 inclination angle
8 stream direction
9 solar cell panel
10 main frame member
11 solar cell panel main holding portion
12 main wall portion
13 main outer wall
14 main inner wall
15 main base piece
16 main bottom piece
17 internal space
20 sub-frame member
21 solar cell panel sub-holding portion
22 sub-wall portion
23 sub-outer wall
24 sub-inner wall
25 sub-base piece
26 sub-bottom piece
27 internal space
28 water barrier piece
30 main frame member
31 solar cell panel main holding portion
32 main wall portion
33 main outer wall
34 main inner wall
35 main base piece
36 main bottom piece
37 internal space
40 sub-frame member 41 solar cell panel sub-holding portion
42 sub-wall portion
43 sub-outer wall
44 sub-inner wall
45 sub-base piece
46 sub-bottom piece
47 internal space
48 gap
50 main frame member
51 solar cell panel main holding portion
54 main inner wall
55 main base piece
56 main bottom piece
57 internal space
60 sub-frame member
61 solar cell panel sub-holding portion
62 sub-wall portion
63 sub-outer wall
64 sub-inner wall
65 sub-base piece
66 sub-bottom piece
67 internal space
70 sub-frame member
71 solar cell panel sub-holding portion
72 sub-wall portion
73 sub-outer wall
74 sub-inner wall
75 sub-base piece
76 sub-bottom piece
77 internal space
78 removal necessary portion

BEST MODE FOR CARRYING OUT THE INVENTION

Next, solar cell modules according to Embodiments of the present invention are described with reference to the drawings. In the description of these embodiments, solar cell modules according to four types of embodiments, namely Embodiments 1 to 4, are described.

Embodiment 1

Figure 2:
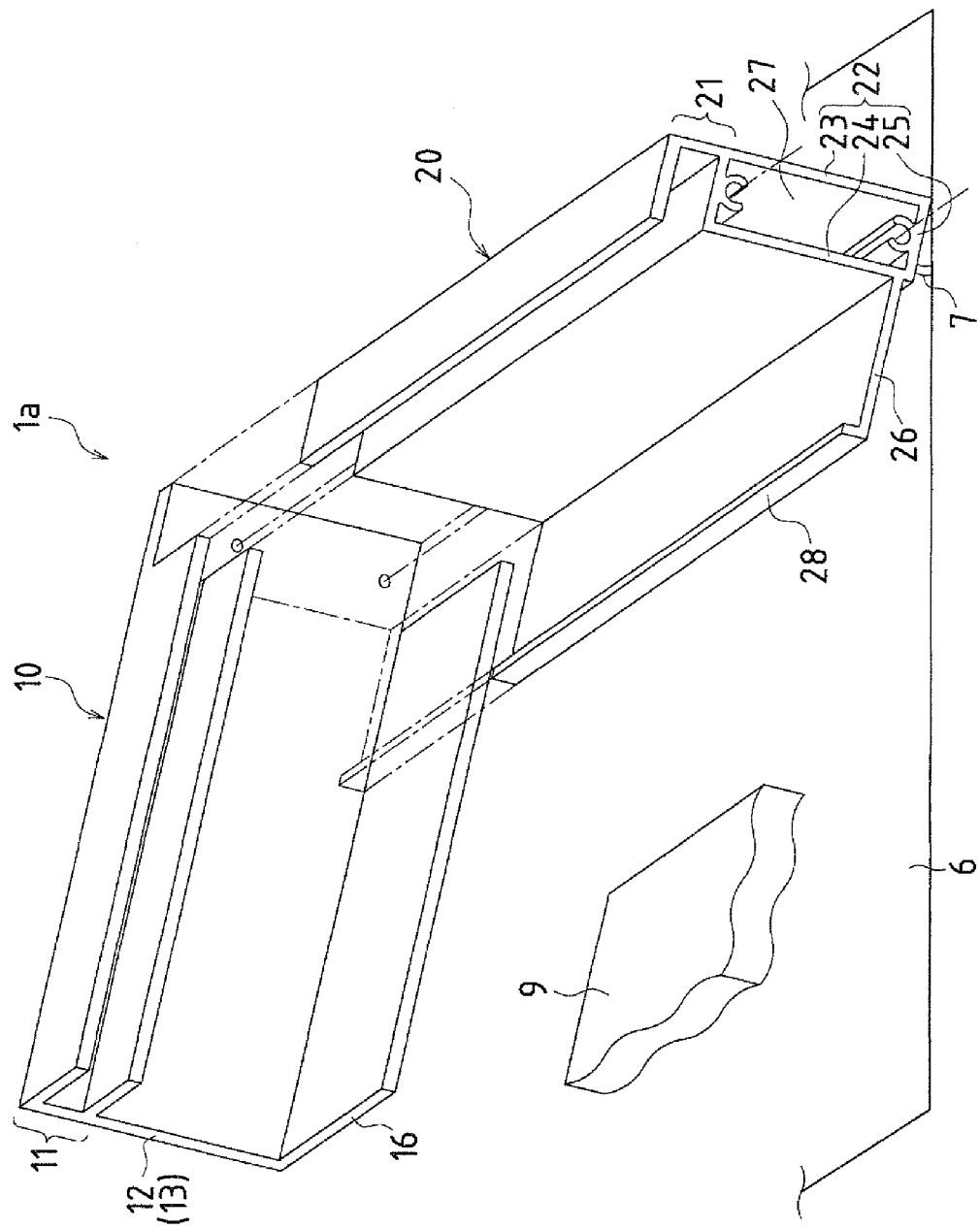
FIG. 2 is a partial exploded perspective view of the solar cell module according to Embodiment 1 of the present invention.
Figure 3:
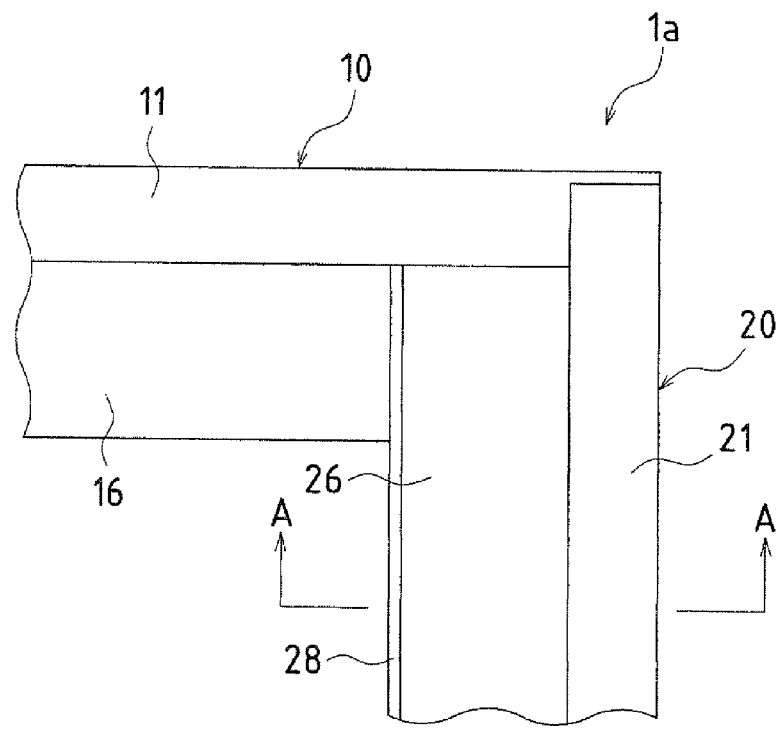
FIG. 3 is a partial plan view of the solar cell module according to Embodiment 1 of the present invention.
Figure 4:
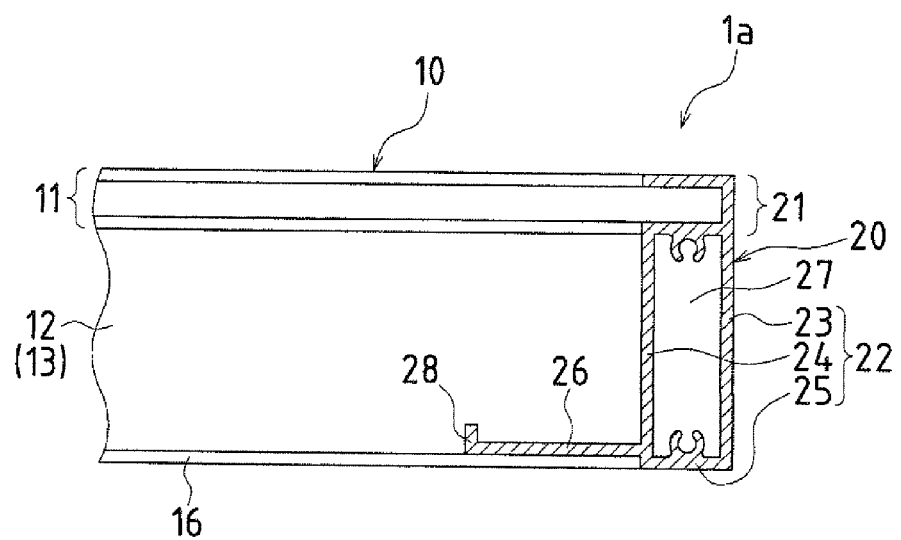
FIG. 4 is a cross-sectional view taken along A-A in FIG. 3.

FIG. 1 is a partial perspective view showing the structure of a solar cell module 1a according to Embodiment 1, FIG. 2 is a partial exploded perspective view thereof, FIG. 3 is a partial plan view thereof, and FIG. 4 is a cross-sectional view taken along A-A in FIG. 3. Note that in FIGS. 1, 3, and 4, a solar cell panel 9 is omitted, and FIGS. 1 and 2 show that the solar cell module 1a is inclined relative to a horizontal surface 6 with an inclination angle 7. That is, the solar cell module 1a according to Embodiment 1 is installed in an inclined manner on an inclined place such as a roof, such that one of the sub-frame members 20 described later is in the lowest position.

The solar cell module 1a according to this Embodiment 1 has the following structure. That is, in FIGS. 1 to 4, the solar cell panel 9 has a rectangular shape, and using two pairs of members, each pair constituted from a main frame member 10 that holds one side of this solar cell panel 9 and a sub-frame member 20 that holds an adjoining side that adjoins this one side, the solar cell panel 9 is held so as to be surrounded on the inner side.

The above-mentioned main frame member 10 is constituted from a solar cell panel main holding portion 11, a main wall portion 12, and a main bottom piece 16. Among these, the solar cell panel main holding portion 11 has a U-shaped cross section, and inside the U shape, sandwiches one side of the solar cell panel 9 from above and below, holding the solar cell panel 9. The main wall portion 12 is constituted from a main outer wall 13 that is connected to the bottom of the solar cell panel main holding portion 11 and extends downward therefrom. The main bottom piece 16 is provided to the inner side of the lower edge of the main wall portion 12, extending inward.

The sub-frame member 20 is constituted from a solar cell panel sub-holding portion 21, a sub-wall portion 22, and a sub-bottom piece 26. Among these, the solar cell panel sub-holding portion 21 has a U-shaped cross section, and inside the U shape, sandwiches an adjoining side of the solar cell panel 9 from above and below, holding the solar cell panel 9.

The sub-wall portion 22 is provided with a sub-outer wall 23 and a sub-inner wall 24 that extend downward with an internal space 27 sandwiched therebetween, and a sub-base piece 25 that closes the internal space 27 at the lower edges of the sub-outer wall 23 and the sub-inner wall 24, provided under the solar cell panel sub-holding portion 21, the sub-wall portion 22 being constituted with a side end opening of the internal space 27 closed by abutting against the internal surface of the main wall portion 12 of the main frame member 10. The sub-bottom piece 26 is provided to the inner side of the lower part of the sub-inner wall 24 of the sub-wall portion 22, extending inward.

With the above-described solar cell module 1a, as shown in FIG. 4, the sub-bottom piece 26 of the sub-frame member 20 is positioned above the main bottom piece 16 of the main frame member 10, and the lower surface near the side end of this sub-bottom piece 26 abuts against the upper surface near the side end of the main bottom piece 16. Further, a water barrier piece 28 bent upward is formed at the inner side edge of this sub-bottom piece 26.

Accordingly, if the above-mentioned solar cell module 1a is installed in an inclined manner, when it is raining, even though rainwater and the like flow on the main bottom piece 16 of the inclined main frame member 10 from a higher position to a lower position, due to the water barrier piece 28 that is bent upward and formed at the inner side edge of the sub-bottom piece 26 of the sub-frame member 20, as indicated by a stream direction 8 shown in FIG. 1, rainwater and the like are dammed up and discharged downward from the inner side edge of the main bottom piece 16 of the main frame member 10. Therefore, rainwater and the like are prevented from flowing onto the upper surface of the sub-bottom piece 26 of the sub-frame member 20.

Consequently, with the above-mentioned solar cell module 1a, as described above, the side end opening of the internal space 27 of the sub-frame member 20 is closed by abutting against the main wall portion 12 of the main frame member 10 and, further, the flow of rainwater and the like onto the upper surface of the sub-bottom piece 26 of the sub-frame member 20 is prevented. Therefore, rainwater and the like do not flow into the internal space 27 of the sub-wall portion 22 of the sub-frame member 20. Accordingly, it is possible to avoid the sub-wall portion 22 of the sub-frame member 20 being damaged due to rainwater that has flowed into the internal space 27 of this sub-wall portion 22 freezing and expanding in volume. Therefore, if the above-described solar cell module 1a is installed in an inclined manner on an inclined place such as a roof, it is possible to prevent the module being damaged due to the freezing of rainwater and the like that have flowed into it.

Figure 5:
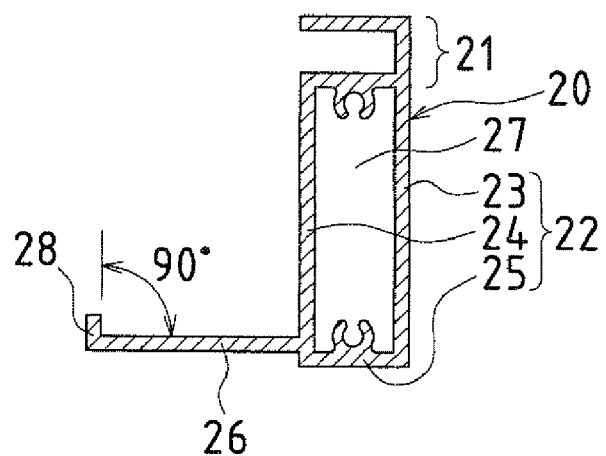
FIG. 5 is a (first) cross-sectional view showing the shape of the edge of a water barrier piece of a sub-frame member of the solar cell module according to Embodiment 1 of the present invention.
Figure 6:
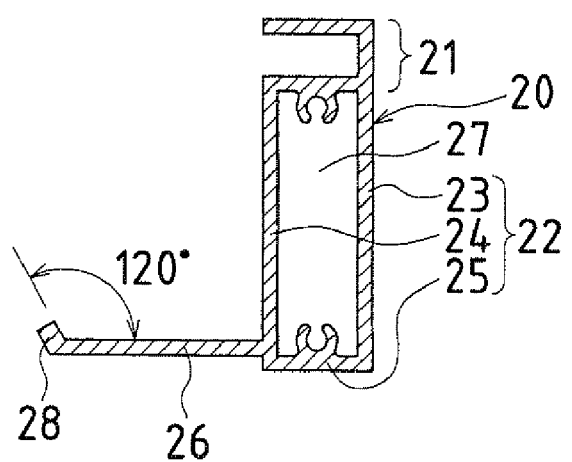
FIG. 6 is a (second) cross-sectional view showing the shape of the edge of the water barrier piece of the sub-frame member of the solar cell module according to Embodiment 1 of the present invention.

With the above-mentioned solar cell module 1a according to Embodiment 1, the angle formed by the water barrier piece 28 and the sub-bottom piece 26 is 90 degrees as shown in FIG. 5. However, the angle is not limited to this, and the angle formed by the water barrier piece 28 and the sub-bottom piece 26 may be an angle between 90 degrees shown in FIG. 5 and 120 degrees shown in FIG. 6. As the angle formed by the water barrier piece 28 and the sub-bottom piece 26, using 90 degrees to 120 degrees is superior compared with a case of using angles other than these, which has been confirmed in an experiment using a trial product.

Figure 7:
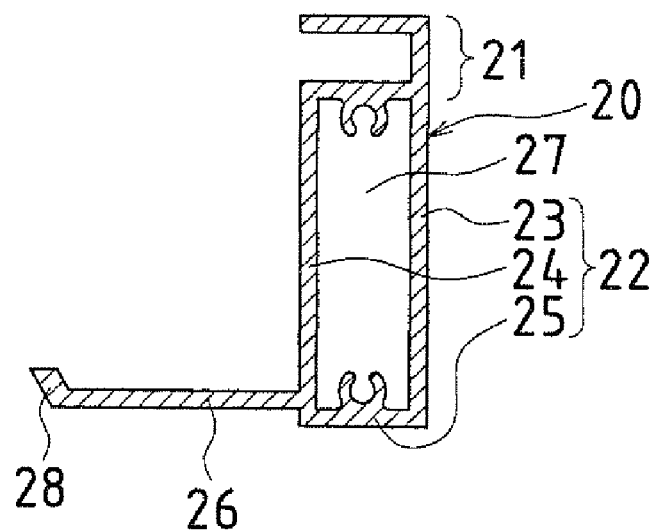
FIG. 7 is a (third) cross-sectional view showing the shape of the edge of the water barrier piece of the sub-frame member of the solar cell module according to Embodiment 1 of the present invention.

Further, as shown in FIG. 7, it is preferable to form the water barrier piece 28 such that the edge surface of this water barrier piece 28 is substantially parallel to the sub-bottom piece 26. By giving the end of this water barrier piece 28 such a shape, when rainwater and the like flow on the main bottom piece 16 of the inclined main frame member 10 from a higher position to a lower position, rainwater and the like are not easily allowed to climb over this water barrier piece 28.

Moreover, it is preferable to form the water barrier piece 28 such that the height to the edge surface of the water barrier piece 28 from the upper surface of the sub-bottom piece 26 is 2 mm or more. A favorable result can be obtained if the height to the edge surface of the water barrier piece 28 from the upper surface of the sub-bottom piece 26 is made 2 mm or more, which has been confirmed in an experiment using a trial product.

Embodiment 2

Figure 8:
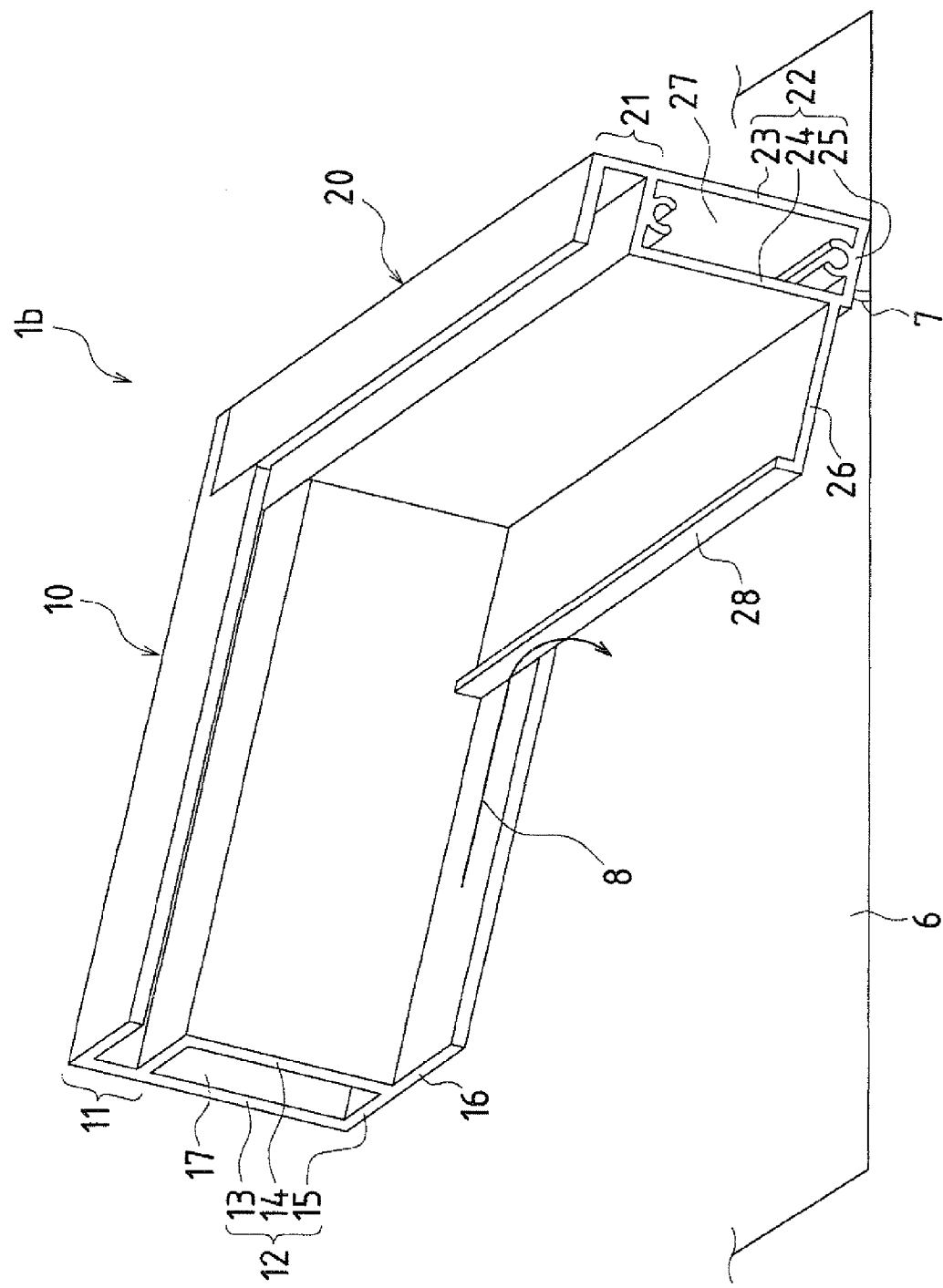
FIG. 8 is a partial perspective view of a solar cell module according to Embodiment 2 of the present invention.
Figure 9:
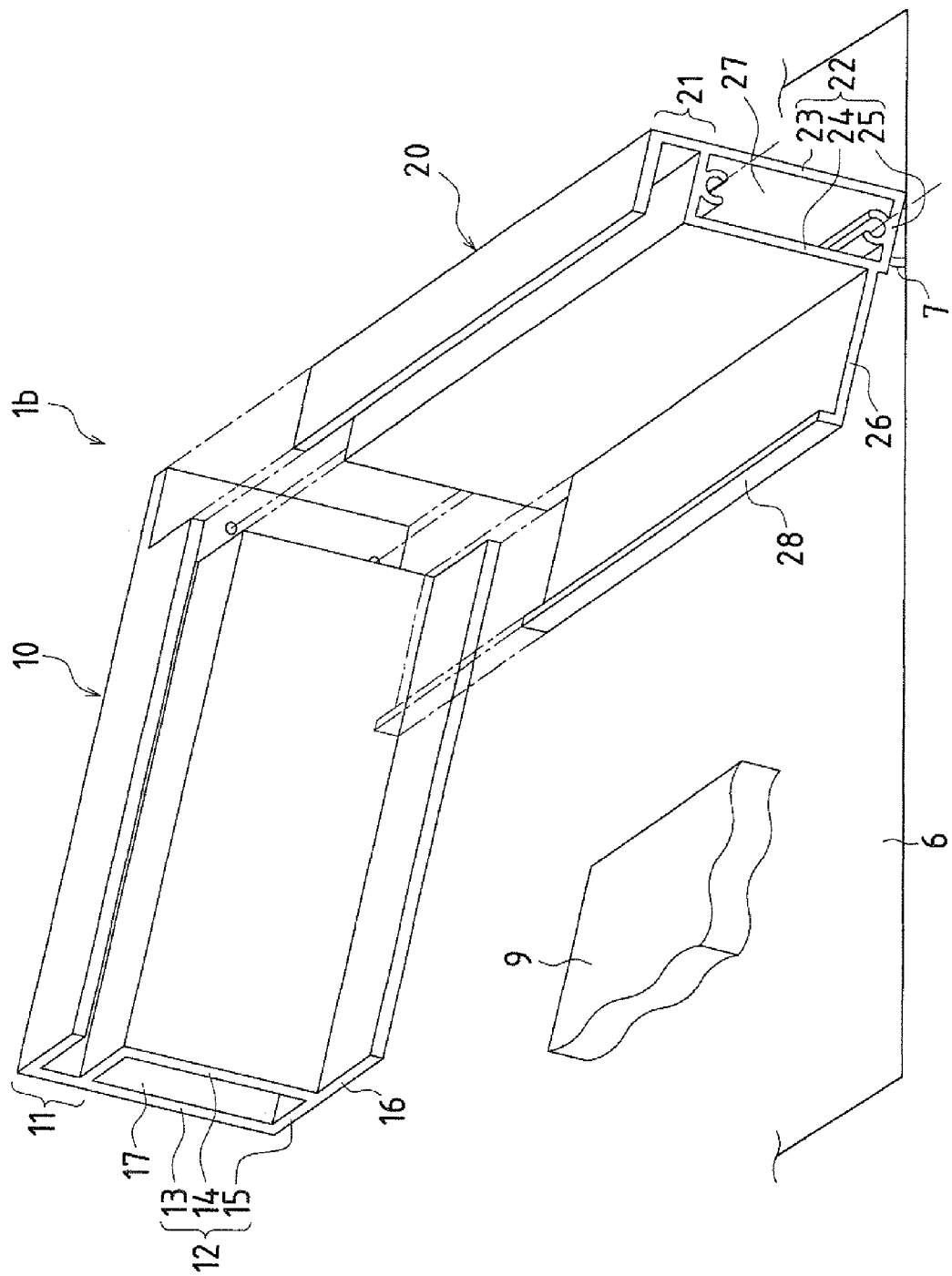
FIG. 9 is a partial exploded perspective view of the solar cell module according to Embodiment 2 of the present invention.
Figure 10:
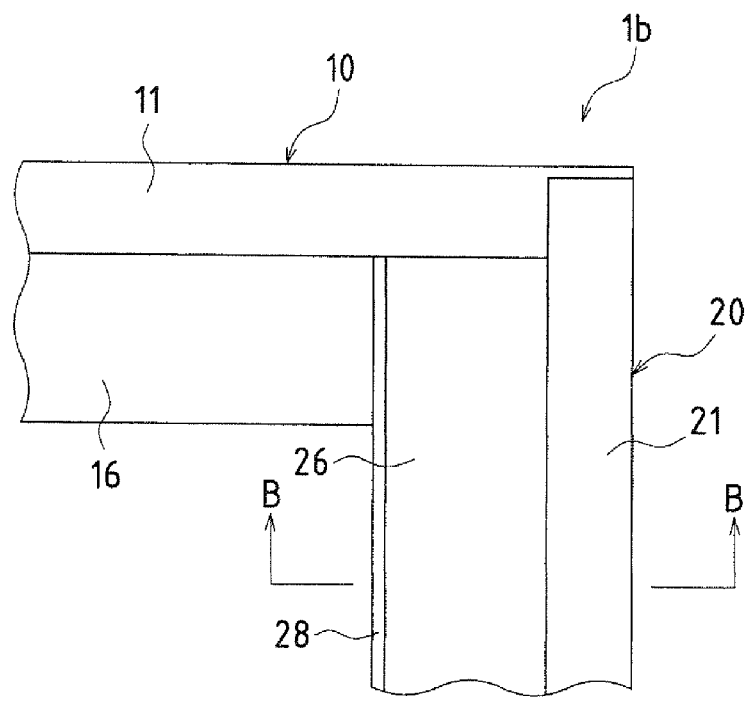
FIG. 10 is a partial plan view of the solar cell module according to Embodiment 2 of the present invention.
Figure 11:
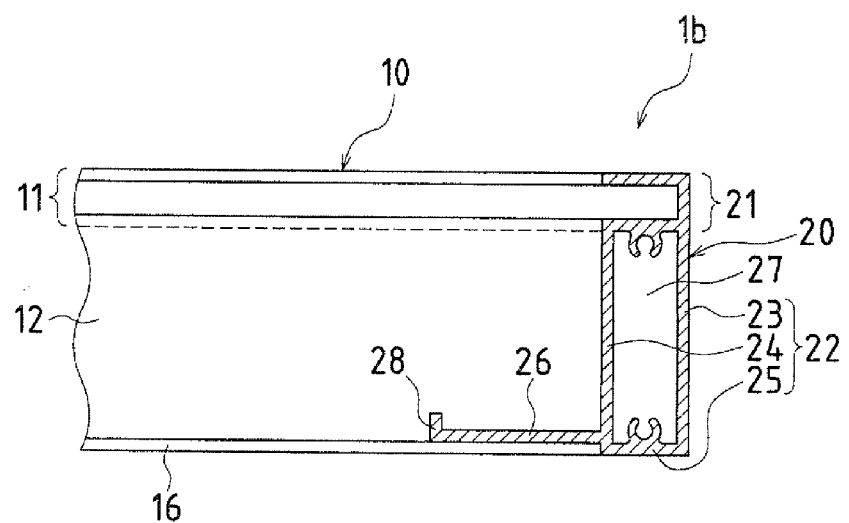
FIG. 11 is a cross-sectional view taken along B-B in FIG. 10.

FIG. 8 is a partial perspective view showing the structure of a solar cell module 1b according to Embodiment 2, FIG. 9 is a partial exploded perspective view thereof, FIG. 10 is a partial plan view thereof, and FIG. 11 is a cross-sectional view taken along B-B in FIG. 10. Note that in FIGS. 8, 10, and 11, a solar cell panel 9 is omitted, and FIGS. 8 and 9 show that the solar cell module 1b is inclined relative to a horizontal surface 6 with an inclination angle 7. That is, the solar cell module 1b according to Embodiment 2 is installed in an inclined manner on an inclined place such as a roof, such that one of the sub-frame members 20 described later is in the lowest position, similar to the solar cell module 1a according to Embodiment 1.

The solar cell module 1b according to Embodiment 2 is almost the same as the solar cell module 1a according to Embodiment 1. The solar cell module 1b according to Embodiment 2 differs from the solar cell module 1a according to Embodiment 1 in that, compared with the solar cell module 1a according to Embodiment 1 provided with the main wall portion 12 of the main frame member 10 formed only using the main outer wall 13, the solar cell module 1b according to Embodiment 2 is provided with the main wall portion 12 of the main frame member 10 constituted from the main outer wall 13, a main inner wall 14, and a main base piece 15, and furthermore an internal space 17 formed therein.

Therefore, the sub-frame member 20 of the solar cell module 1b in Embodiment 2 is completely the same as that of the solar cell module 1a in Embodiment 1, and provision of the water barrier piece 28 to the sub-frame member 20 is similar to the solar cell module 1a according to Embodiment 1.

Accordingly, the function and effect provided to the solar cell module 1b according to Embodiment 2 are completely the same as the function and effect provided to the solar cell module 1a according to Embodiment 1.

Embodiment 3

Figure 12:
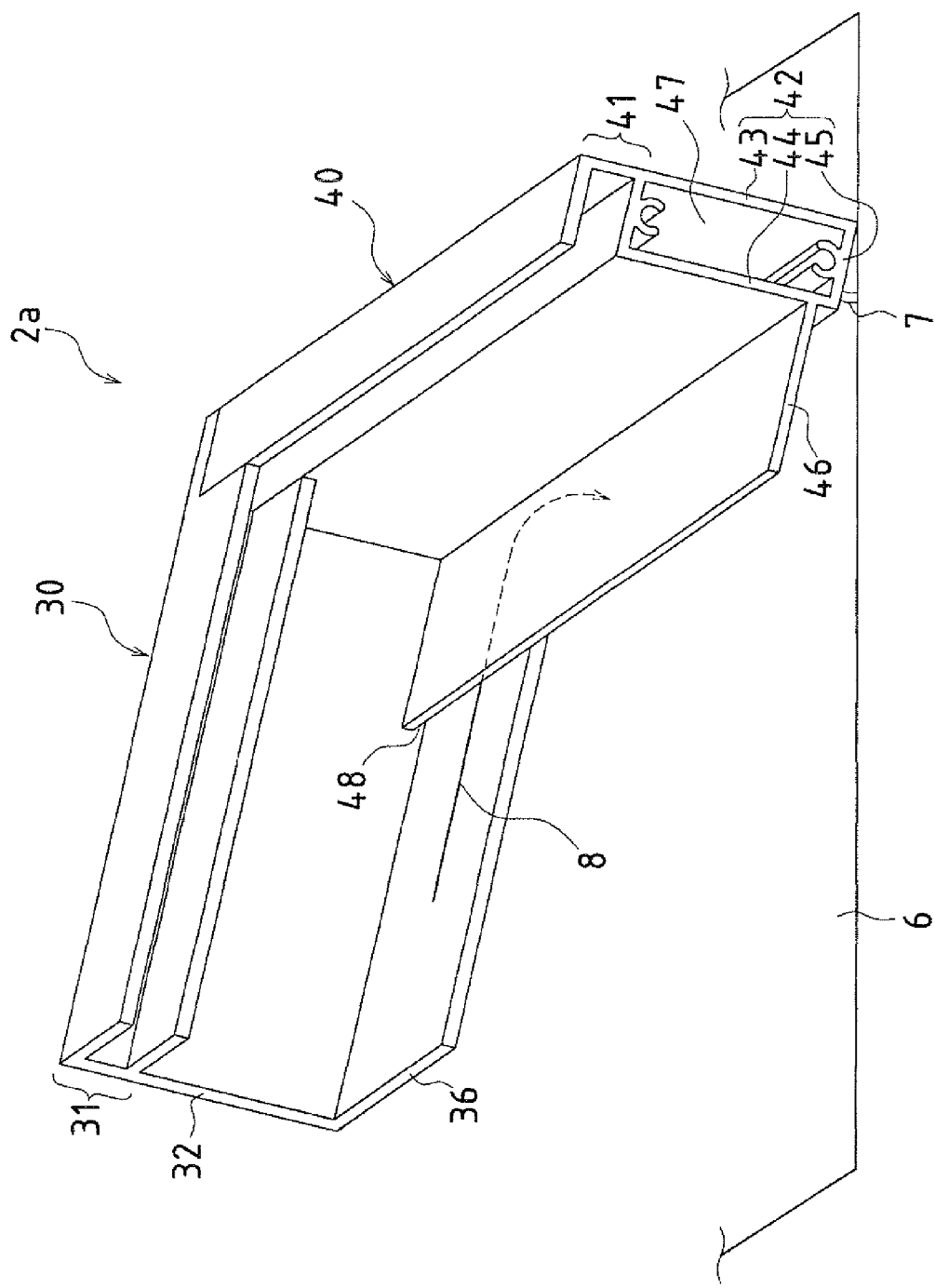
FIG. 12 is a partial perspective view of a solar cell module according to Embodiment 3 of the present invention.
Figure 13:
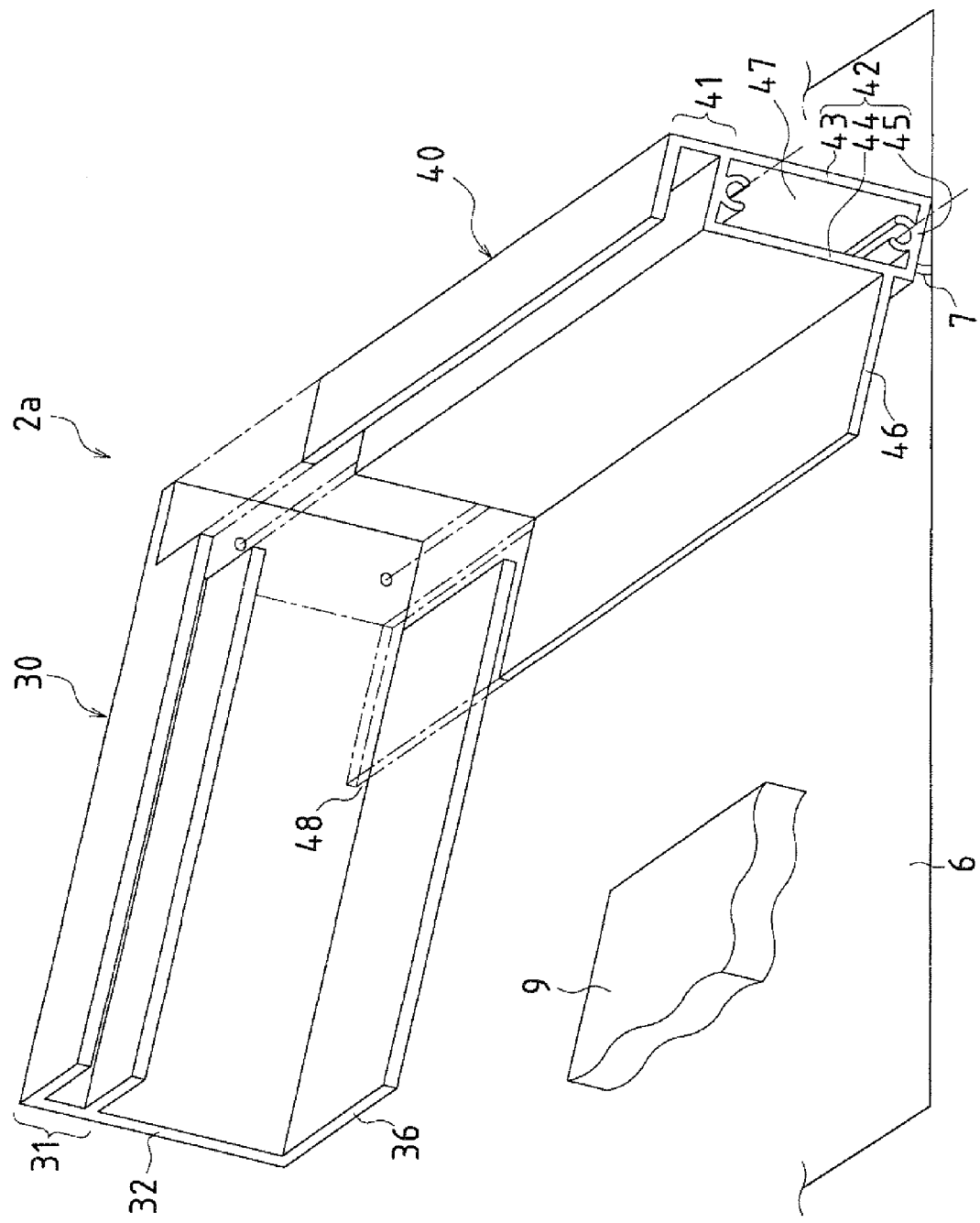
FIG. 13 is a partial exploded perspective view of the solar cell module according to Embodiment 3 of the present invention.
Figure 14:
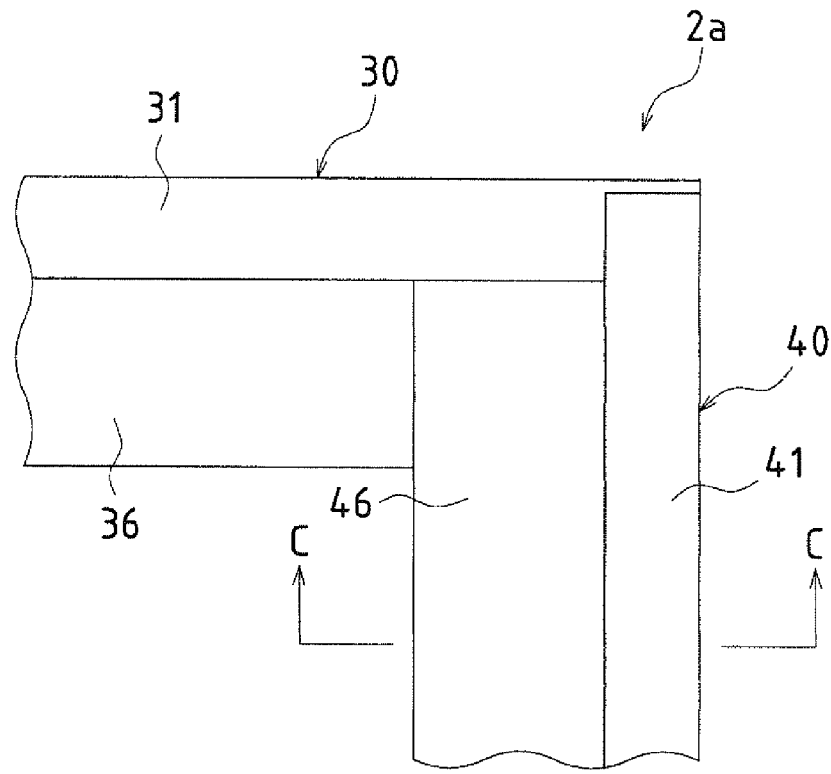
FIG. 14 is a partial plan view of the solar cell module according to Embodiment 3 of the present invention.
Figure 15:
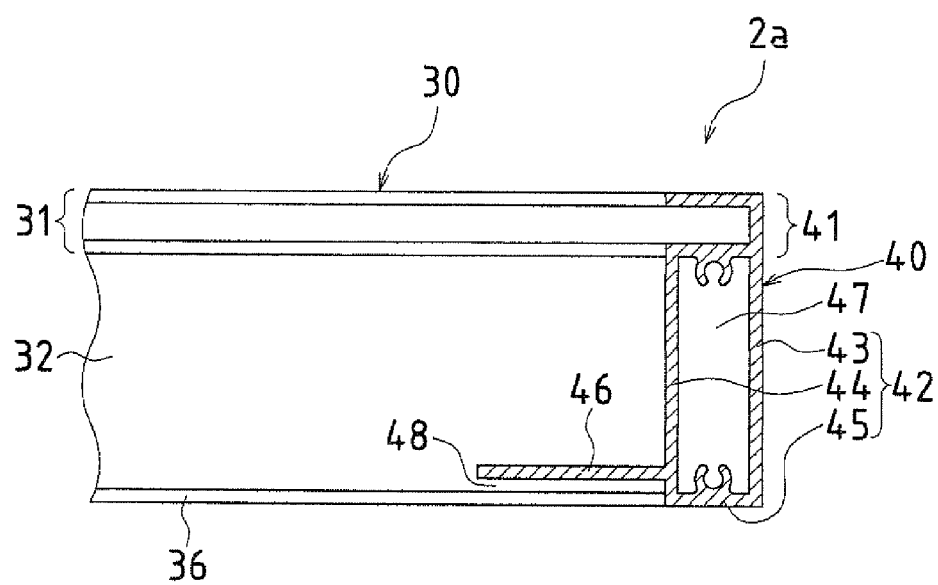
FIG. 15 is a cross-sectional view taken along C-C in FIG. 14.

FIG. 12 is a partial perspective view showing the structure of a solar cell module 2a according to Embodiment 3, FIG. 13 is a partial exploded perspective view thereof, FIG. 14 is a partial plan view thereof, and FIG. 15 is a cross-sectional view taken along C-C in FIG. 14. Note that in FIGS. 12, 14, and 15, a solar cell panel 9 is omitted, and FIGS. 12 and 13 show that the solar cell module 2a is inclined relative to a horizontal surface 6 with an inclination angle 7. That is, the solar cell module 2a according to Embodiment 3 is installed in an inclined manner on an inclined place such as a roof, such that one of the sub-frame members 40 described later is in the lowest position.

The solar cell module 2a according to this Embodiment 3 has the following structure. That is, in FIGS. 12 to 15, the solar cell panel 9 has a rectangular shape, and using two pairs of members, each pair constituted from a main frame member 30 that holds one side of this solar cell panel 9 and a sub-frame member 40 that holds an adjoining side that adjoins this one side, the solar cell panel 9 is held so as to be surrounded on the inner side.

The above-mentioned main frame member 30 is constituted from a solar cell panel main holding portion 31, a main wall portion 32, and a main bottom piece 36. Among these, the solar cell panel main holding portion 31 has a U-shaped cross section, and inside the U shape, sandwiches one side of the solar cell panel 9 from above and below, holding the solar cell panel 9. The main wall portion 32 is constituted from a main outer wall 33 that is connected to the bottom of the solar cell panel main holding portion 31 and extends downward therefrom. The main bottom piece 36 is provided to the inner side of the lower edge of the main wall portion 32, extending inward.

The sub-frame member 40 is constituted from a solar cell panel sub-holding portion 41, a sub-wall portion 42, and a sub-bottom piece 46. Among these, the solar cell panel sub-holding portion 41 has a U-shaped cross section, and inside the U shape, sandwiches an adjoining side of the solar cell panel 9 from above and below so as to hold the solar cell panel 9.

The sub-wall portion 42 is provided with a sub-outer wall 43 and a sub-inner wall 44 that extend downward with an internal space 47 sandwiched therebetween, and a sub-base piece 45 that closes the internal space 47 at the lower edges of the sub-outer wall 43 and the sub-inner wall 44, provided under the solar cell panel sub-holding portion 41, the sub-wall portion 42 being constituted with a side end opening of the internal space 47 closed by abutting against the internal surface of the main wall portion 32 of the main frame member 30. The sub-bottom piece 46 is provided to the inner side of the lower part of the sub-inner wall 44 of the sub-wall portion 42, extending inward.

With the above-mentioned solar cell module 2a, as shown in FIG. 15, the sub-bottom piece 46 of the sub-frame member 40 is positioned above the main bottom piece 36 of the main frame member 30, and a gap 48 into which water can flow is formed between the sub-bottom piece 46 of the sub-frame member 40 and the main bottom piece 36 of the main frame member 30.

Accordingly, if the above-mentioned solar cell module 2a is installed in an inclined manner, when it is raining, even though rainwater and the like flow on the main bottom piece 36 of the inclined main frame member 30 from a higher position to a lower position, since the gap 48 into which water can flow is formed between the sub-bottom piece 46 of the sub-frame member 40 and the main bottom piece 36 of the main frame member 30, rainwater and the like flow into the gap 48 into which this water can flow, and are discharged downward as indicated by a stream direction 8 shown in FIG. 12. Therefore, rainwater and the like are prevented from flowing onto the upper surface of the sub-bottom piece 46.

Consequently, with the above-mentioned solar cell module 2a, as described above, the side end opening of the internal space 47 of the sub-frame member 40 is closed by abutting against the main wall portion 32 of the main frame member 30 and, further, the flow of rainwater and the like onto the upper surface of the sub-bottom piece 46 of the sub-frame member 40 is prevented. Therefore, rainwater and the like do not flow into the internal space 47 of the sub-wall portion 42. Accordingly, it is possible to avoid the sub-wall portion 42 of the sub-frame member 40 being damaged due to rainwater that has flowed into the internal space 47 of the sub-wall portion 42 freezing and expanding in volume. Therefore, if the above-mentioned solar cell module 2a is installed in an inclined manner on an inclined place such as a roof, it is possible to prevent the module being damaged due to the freezing of rainwater and the like that have flowed into it.

Embodiment 4

Figure 16:
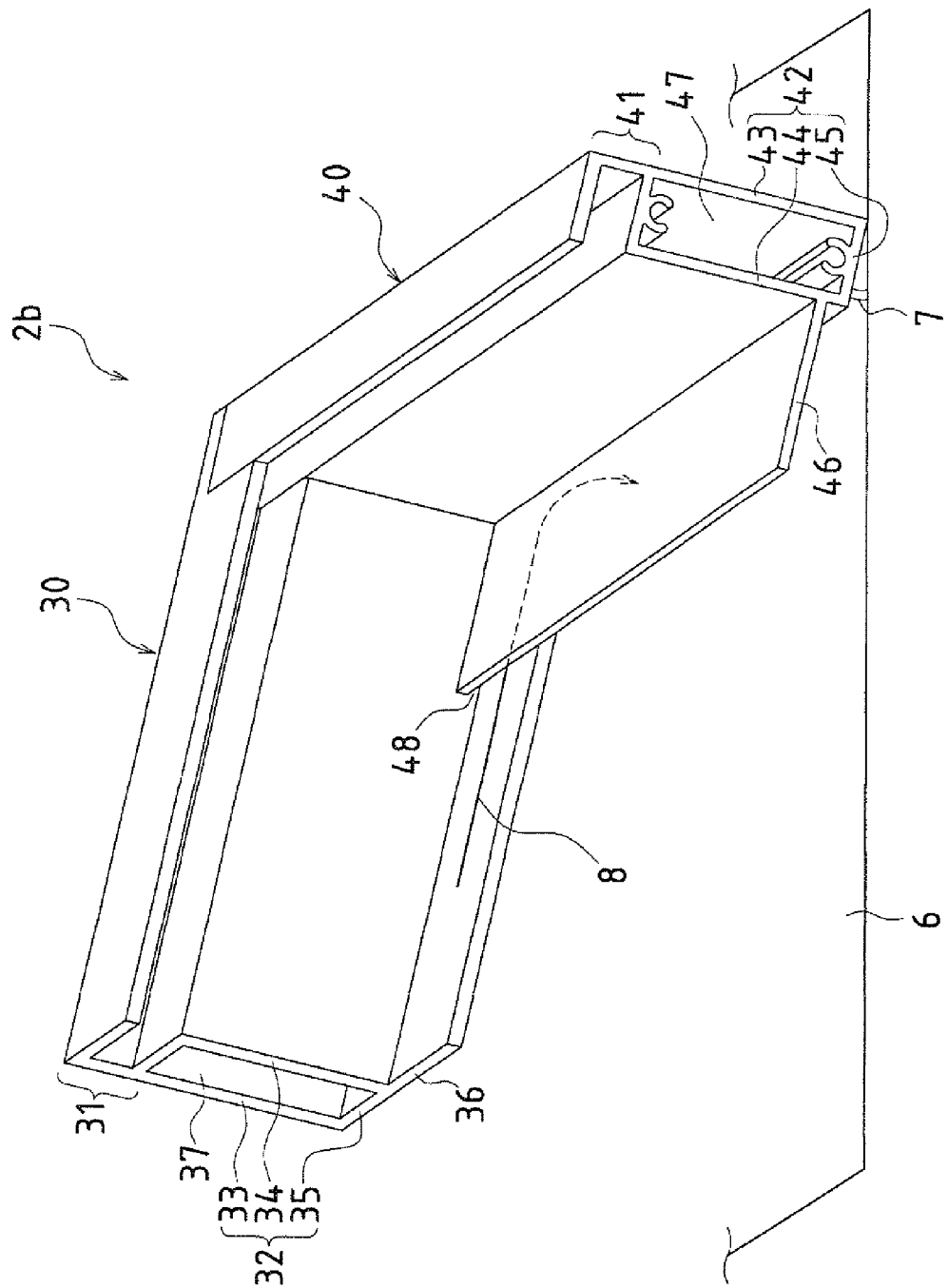
FIG. 16 is a partial perspective view of a solar cell module according to Embodiment 4 of the present invention.
Figure 17:
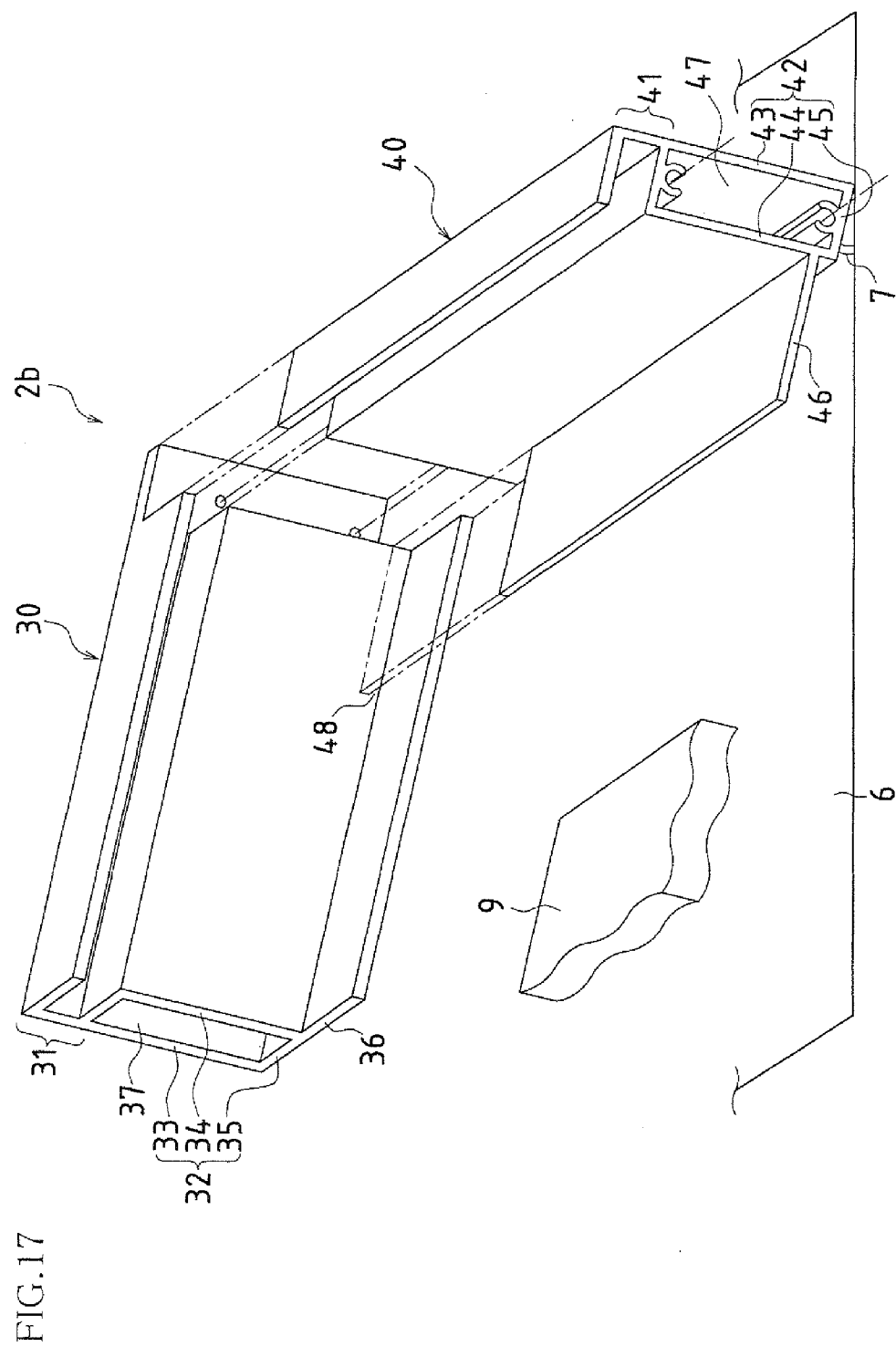
FIG. 17 is a partial exploded perspective view of the solar cell module according to Embodiment 4 of the present invention.
Figure 18:
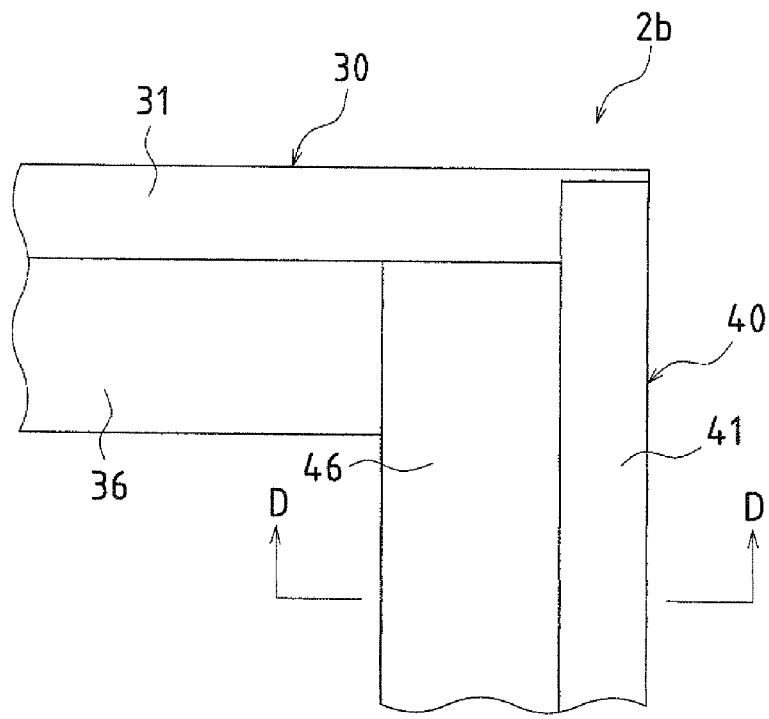
FIG. 18 is a partial plan view of the solar cell module according to Embodiment 4 of the present invention.
Figure 19:
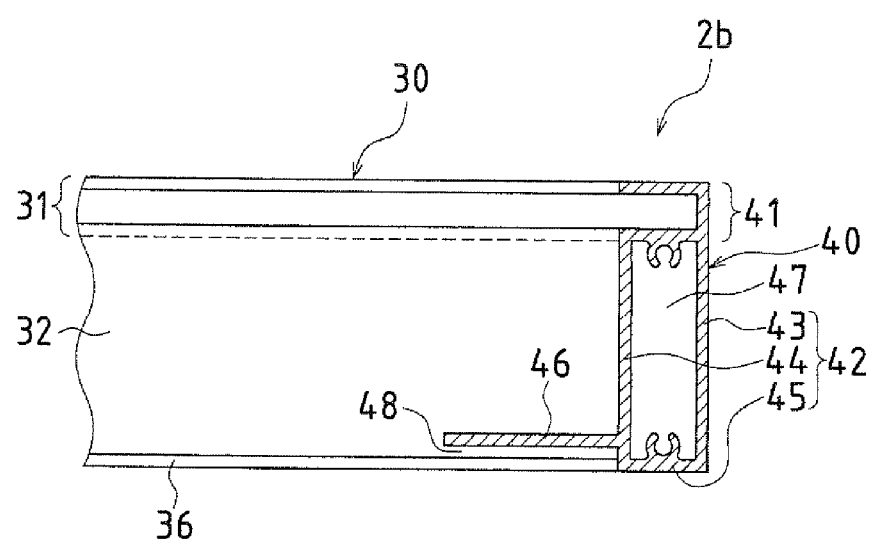
FIG. 19 is a cross-sectional view taken along D-D in FIG. 18.
Figure 20:
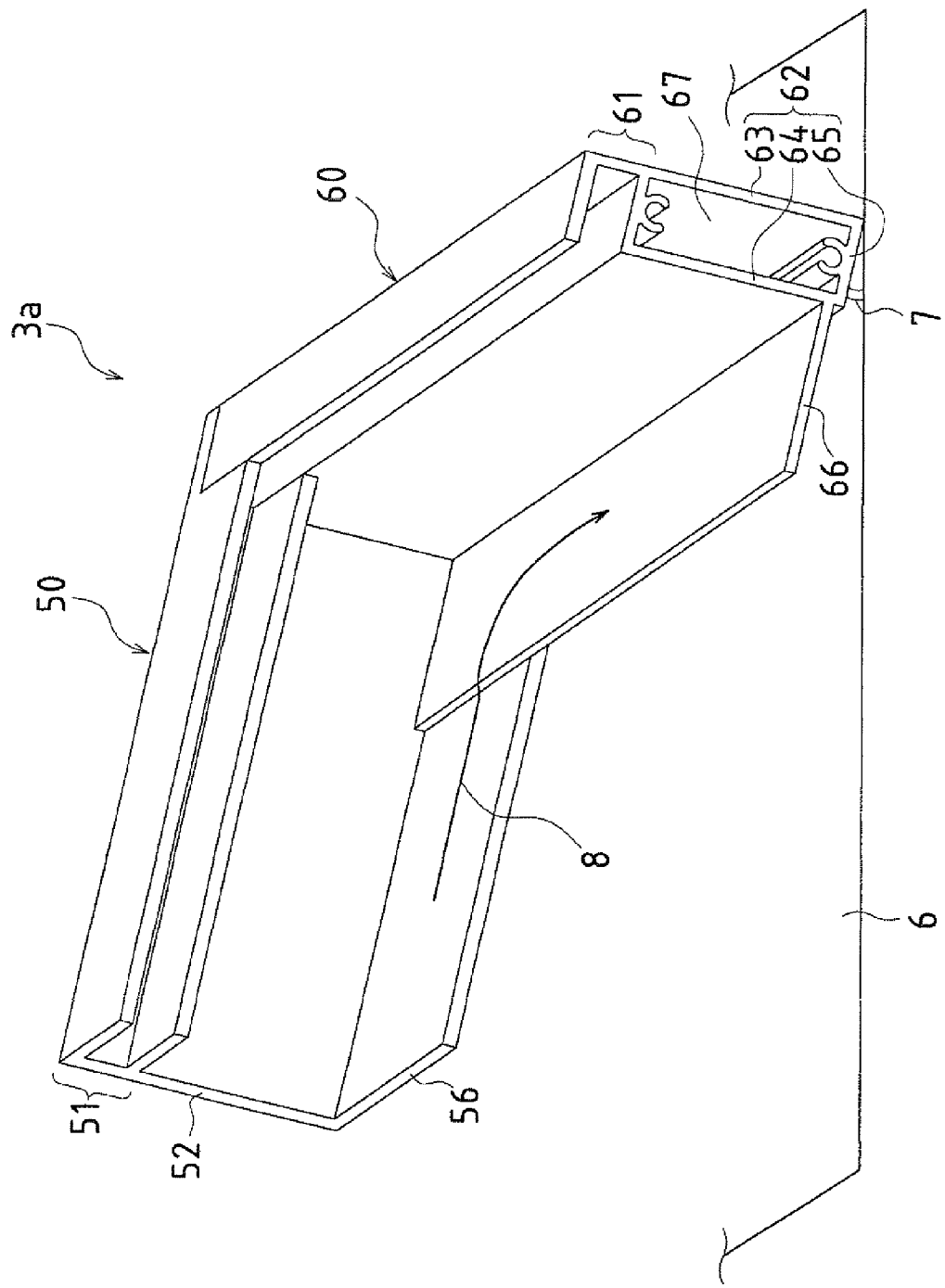
FIG. 20 is a partial perspective view of a solar cell module according to an improved conventional example.
Figure 21:
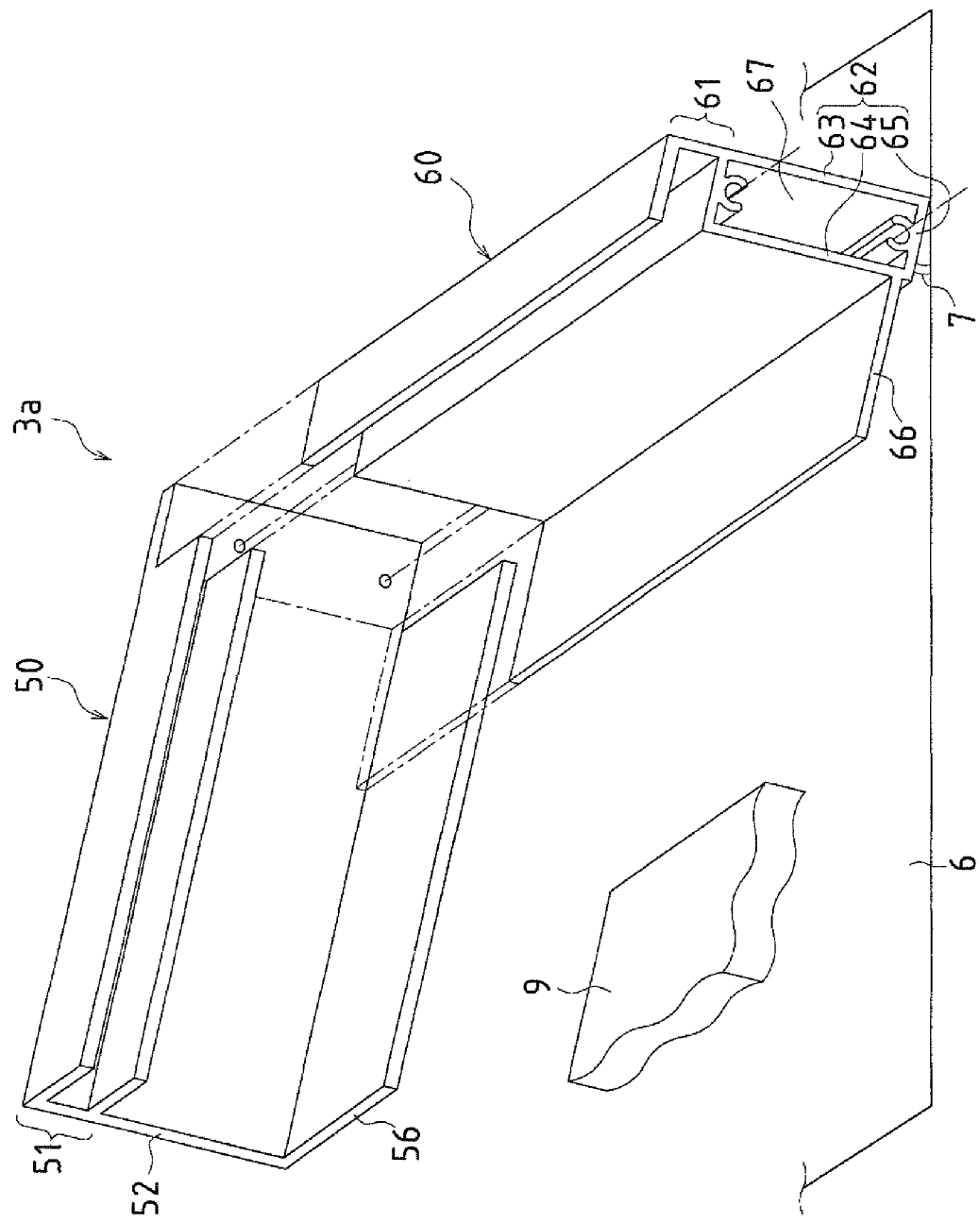
FIG. 21 is a partial exploded perspective view of the solar cell module according to the improved conventional example.
Figure 22:
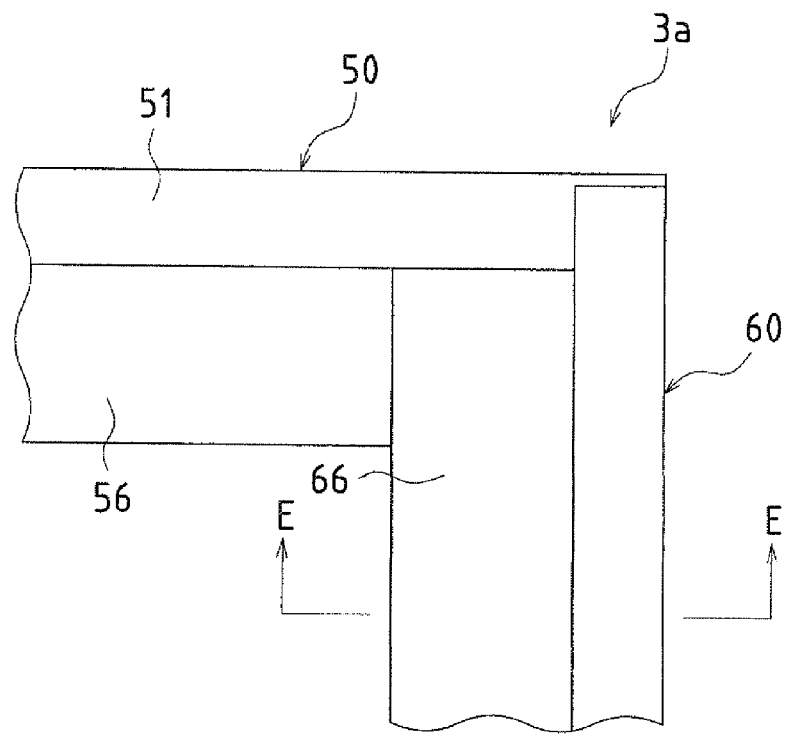
FIG. 22 is a partial plan view of the solar cell module according to the improved conventional example.
Figure 23:
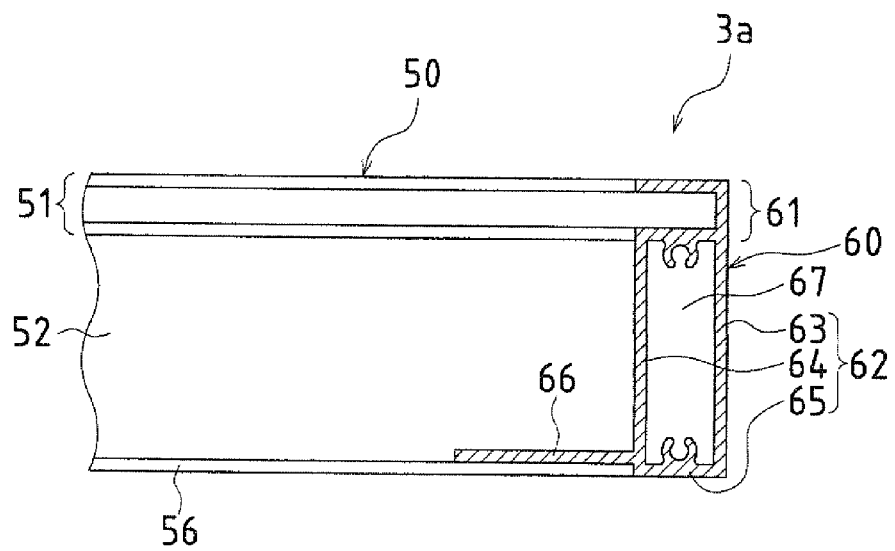
FIG. 23 is a cross-sectional view taken along E-E in FIG. 22.
Figure 24:
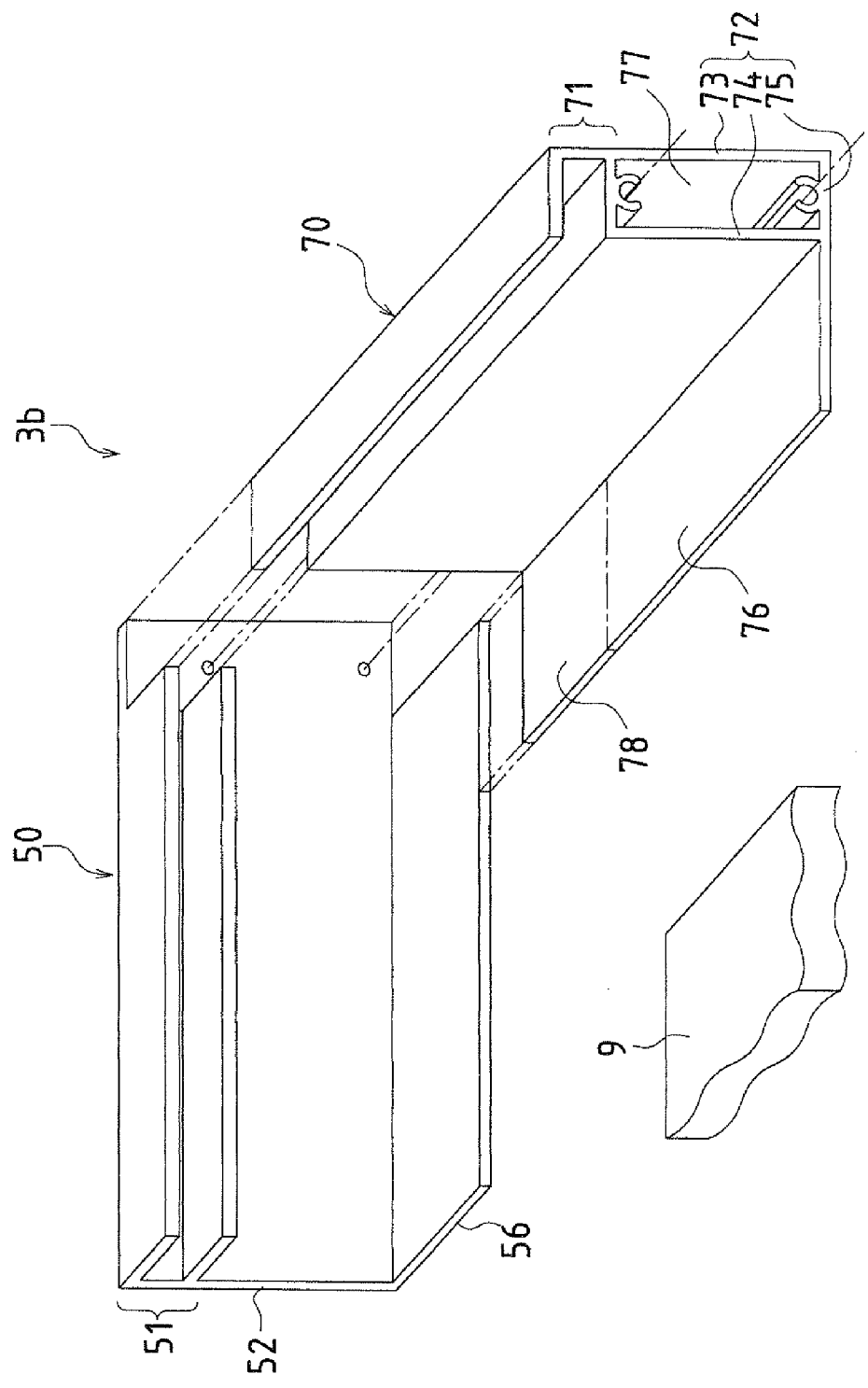
FIG. 24 is a partial exploded perspective view of a solar cell module according to the conventional example.

FIG. 16 is a partial perspective view showing the structure of a solar cell module 2b according to Embodiment 4, FIG. 17 is a partial exploded perspective view thereof, FIG. 18 is a partial plan view thereof, and FIG. 19 is a cross-sectional view taken along D-D in FIG. 18. Note that in FIGS. 16, 18, and 19, a solar cell panel 9 is omitted, and FIGS. 16 and 17 show that the solar cell module 2b is inclined relative to a horizontal surface 6 with an inclination angle 7. That is, the solar cell module 2b according to Embodiment 4 is installed in an inclined manner on an inclined place such as a roof, such that one of the sub-frame members 40 described later is in the lowest position, similar to the solar cell module 2a according to Embodiment 3.

The solar cell module 2b according to Embodiment 4 is almost the same as the solar cell module 2a according to Embodiment 3. The solar cell module 2b according to Embodiment 4 differs from the solar cell module 2a according to Embodiment 3 in that, compared with the solar cell module 2a according to Embodiment 3 provided with the main wall portion 32 of the main frame member 30 formed only using the main outer wall 33, the solar cell module 2b according to Embodiment 4 is provided with the main wall portion 32 of the main frame member 30 constituted from the main outer wall 33, a main inner wall 34, and a main base piece 35, and furthermore an internal space 37 formed therein.

Therefore, the sub-frame member 40 of the solar cell module 2b in Embodiment 4 is completely the same as that of the solar cell module 2a in Embodiment 3. As shown in FIG. 19, the sub-bottom piece 46 of the sub-frame member 40 is positioned above the main bottom piece 36 of the main frame member 30, and a gap 48 into which water can flow is formed between the sub-bottom piece 46 of the sub-frame member 40 and the main bottom piece 36 of the main frame member 30, which is similar to the solar cell module 2a according to Embodiment 3.

Accordingly, the function and effect provided to the solar cell module 2b according to Embodiment 4 are completely the same as the function and effect provided to the solar cell module 2a according to Embodiment 3.

The present invention may be embodied in various other forms without departing from the gist or essential characteristics thereof. Therefore, the embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

This application claims priority on Japanese Patent Application No. 2007-226606 filed in Japan on Aug. 31, 2007, the contents of which are incorporated herein by reference. Furthermore, the entire contents of references cited in the present specification are herein specifically incorporated by reference.

INDUSTRIAL APPLICABILITY

A solar cell module of the present invention is useful since it is possible to prevent the module being damaged due to the freezing of rainwater and the like that have flowed into it if the module is installed in an inclined manner on an inclined place such as a roof.

The invention claimed is:

1. A solar cell module that holds a solar cell panel so as to surround the solar cell panel on its inner side using a plurality of pairs of members, each pair constituted from a main frame member that holds one side of the solar cell panel and a sub-frame member that holds an adjoining side that adjoins the one side, and that can be installed in an inclined manner on an inclined place, such as a roof, such that one of the sub-frame members is in a lowest position, wherein the main frame member comprises:
 a solar cell panel main holding portion that has a U-shaped cross section, and sandwiches the one side of the solar cell panel from above and below inside the U shape, holding the solar cell panel;
 a main wall portion that is connected to the bottom of the solar cell panel main holding portion, extending downward therefrom; and
 a main bottom piece that is provided to an inner side of a lower edge of the main wall portion, extending inward, the sub-frame member comprises:
 a solar cell panel sub-holding portion that has a U-shaped cross section, and sandwiches the adjoining side of the solar cell panel from above and below inside the U shape, holding the solar cell panel;
 a sub-wall portion comprising a sub-outer wall and a sub-inner wall that extend downward with an internal space sandwiched therebetween, and a sub-base piece that closes the internal space at lower edges of the sub-outer wall and the sub-inner wall, provided under the solar cell panel sub-holding portion, the sub-wall portion being constituted with a side end opening of the internal space closed by abutting against the main wall portion of the main frame member; and
 a sub-bottom piece that is provided to an inner side of a lower part of the sub-inner wall of the sub-wall portion, extending inward, and the sub-bottom piece is positioned above the main bottom piece of the main frame member, and is formed such that there is a gap into which water can flow between the sub-bottom piece and the main bottom piece.

* * * * *